United States Patent [19]
Baxter

[11] Patent Number: 5,623,401
[45] Date of Patent: Apr. 22, 1997

[54] INDUSTRIAL CONTROLLER WITH OPTIMIZED EXECUTION OF RELAY LADDER LOGIC PROGRAMS

[75] Inventor: Ira D. Baxter, Austin, Tex.

[73] Assignee: Allen-Bradley Company, Inc., Milwaukee, Wis.

[21] Appl. No.: 515,877

[22] Filed: Aug. 16, 1995

[51] Int. Cl.$^6$ .............................. G05B 11/01; G06F 9/45
[52] U.S. Cl. ............................................ 364/147; 364/191
[58] Field of Search ..................................... 364/140, 141, 364/146, 147, 188, 191–193; 395/375, 700

[56] References Cited

U.S. PATENT DOCUMENTS

| | | | |
|---|---|---|---|
| 4,722,071 | 1/1988 | Gates et al. ............................... | 364/141 |
| 5,233,697 | 8/1993 | Yamauchi ................................ | 395/375 |
| 5,265,004 | 11/1993 | Schultz et al. .......................... | 364/147 |
| 5,504,902 | 4/1996 | McGrath et al. ....................... | 395/700 |
| 5,586,335 | 12/1996 | Utan ........................................ | 364/147 |

*Primary Examiner*—Paul P. Gordon
*Assistant Examiner*—Steven R. Garland
*Attorney, Agent, or Firm*—Keith M. Baxter; John M. Miller; John J. Horn

[57] ABSTRACT

A method of operating an industrial control system converts relay ladder logic programs into flow type programs expressed as 'logical gates' connected with 'wires' representing variables. This formulation is converted to an efficient code structure in which changes in state of the variables are evaluated and only changes are propagated in evaluating program outputs. The net effect is many steps of evaluation in the control program are avoided during real-time operation of the program connected to controlled equipment.

11 Claims, 5 Drawing Sheets

```
       SOR  BST   ①XIO(F)  ②XIC(B)
                  ③
            NXB   XIO(C)
            ④
            BND   OTE(F)

EOR
                  ⑤        ⑥        ⑦
       SOR  XIO(F)  XIO(D)  XIO(B)  OTE(G)

EOR
```
93

INDUSTRIAL CONTROLLER WITH OPTIMIZED EXECUTION OF RELAY LADDER LOGIC PROGRAMS

FIELD OF THE INVENTION

The present invention relates to industrial controllers for the real-time control of industrial processes and, in particular, to a method of increasing the execution speed of such controllers when they are running relay ladder logic programs.

BACKGROUND OF THE INVENTION

Industrial controllers are special purpose computers used for controlling industrial processes or manufacturing equipment.

Under the direction of a stored program, the industrial controller examines a series of inputs reflecting the status of a controlled process and changes outputs affecting control of the process. The inputs and outputs are mostly binary, that is "ON" or "OFF"; however, analog inputs and outputs, taking on a continuous range of values and multibit digital values are also used.

Industrial controllers are frequently programmed in "relay ladder" language where instructions are represented graphically by "contacts" and "coils" of virtual relays connected and arranged in ladder-like rungs across a power and ground rail. This relay ladder language, with its input contacts and output coils, reflects the emphasis in industrial control on the processing of large amounts of input and output data.

Relay ladder language also reflects the fact that most industrial control is "real-time"; that is, an ideal industrial controller behaves as if it were actually composed of multiple relays connected in parallel rungs to provide outputs in essentially instantaneous response to changing inputs.

In a typical relay ladder logic program, the rungs composed of contacts and output coils are evaluated in sequence from the first to the last rung and then this process is repeated. At each rung, inputs represented by the contacts are read from memory (as obtained from inputs from the controlled process or the previous evaluation of coils of other rungs). These inputs are evaluated according to the logic reflected in the connection of the contacts into one or more branches within the rungs. Contacts in series across a rung represent a Boolean AND logic whereas contacts in different branches and thus in parallel across the rung represent Boolean OR logic. Special "normally closed" contacts provide Boolean NOT logic.

Typically, a single output coil at the end of each rung is set or reset based on the evaluation of that rung and this setting or resetting is reflected in the writing to memory of a bit (which ultimately becomes an output to the industrial process).

Once the given rung is evaluated, the next rung is evaluated and so forth. In the simplest form of relay ladder logic programming, there are no jumps, i.e. all rungs are evaluated in a cycle or "scan" through the rungs. For this reason, the execution time of the program is relatively constant on a scan-to-scan basis. This is in contrast to conventional computer programming, where branch and jump instructions cause later instructions or groups of instructions to be skipped depending on the outcome of a test associated with those branch or Jump instructions.

The amount of time required to complete one scan ("scan time") is an important measure of system performance. Generally, the scan time affects how quickly the controller can respond to an input from the controlled process. In simple relay ladder logic programming, the scan time of the program will depend on how many rungs there are in the relay ladder logic program.

In complex control systems, the relay ladder logic program may have many rungs and require a relatively long scan time with the result that response time of the control system is significantly slowed.

SUMMARY OF THE INVENTION

The present invention provides a system that reduces the scan time of a relay ladder logic program by eliminating the execution of rungs whose evaluation (coil states) will not change during a given scan in light of previously executed rungs. The present invention effectively determines which rungs need not be evaluated, on a scan-by-scan basis, without adding significant overhead to the execution of the program.

Generally, the invention achieves these results by translating the relay ladder logic diagram (in which "variables" are represented by contacts and coils, and "logic" is represented by their interconnection) into a "flow diagram" where the "logic" is represented by Boolean elements (such as AND gates) and the "variables" are represented by data paths (wires) between the Boolean elements. Each of these data paths is converted to a short routine which is assembled with other routines into the overall control program.

A given routine calls other routines in the program only if there has been a change in the output of a Boolean element associated with the given routine. Thus, only certain "branches" of the flow diagram are executed, i.e., those associated with Boolean elements having changed outputs. The net effect is that the control program, on a real-time basis, eliminates the evaluation of portions of a control program (in a manner that changes from scan to scan) improving the scan time.

Specifically, the present invention provides an industrial controller having: input circuitry for receiving data from the industrial process and output circuitry for providing data to the industrial process. The industrial controller also includes a programming terminal for receiving a relay ladder language control program having: (i) a plurality of virtual contacts and coils, the virtual contacts representing the data from the industrial process and the virtual coils representing the data to the industrial process; and (ii) a plurality of interconnections between contacts and coils in rungs, the interconnections representing the control logic for the industrial process.

The industrial controller also includes a computer and memory receiving the relay ladder diagram from the input terminal to: (1) translating the relay ladder diagram into a data flow form, the data flow form providing: (i) a plurality of Boolean elements having inputs and outputs, the Boolean elements representing the control logic for the industrial process, and (ii) a plurality of data paths between inputs and outputs of Boolean elements; the data paths corresponding to the data to and from the industrial process. The computer is programmed to associate each data path with a transition routine determining the effect of a transition in data of the given data path on the outputs of any directly connected Boolean elements having inputs connected to that data path. The computer is also programmed to combine the transition routines of step (2) into a control program by having each given transition routine call transition routines associated with data paths connected to outputs of the given transition routine's directly connected Boolean elements.

The industrial controller further includes an input monitor connected to the input circuitry to detect changes in data input from the industrial process to call, in an operation mode, transition routines for the data paths associated with the input data. A data path monitor monitors the data paths corresponding to data to the industrial process to output that data to the industrial process through the output circuitry.

Thus, it is an object of the invention to translate a relay ladder diagram into a form where only changes in inputs or intervening variables are processed during the real-time operation of the industrial control. In this manner, the number of evaluations of variables during a scanning of the control program is much reduced resulting in quicker scan times.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Control Environment

Figure 1:
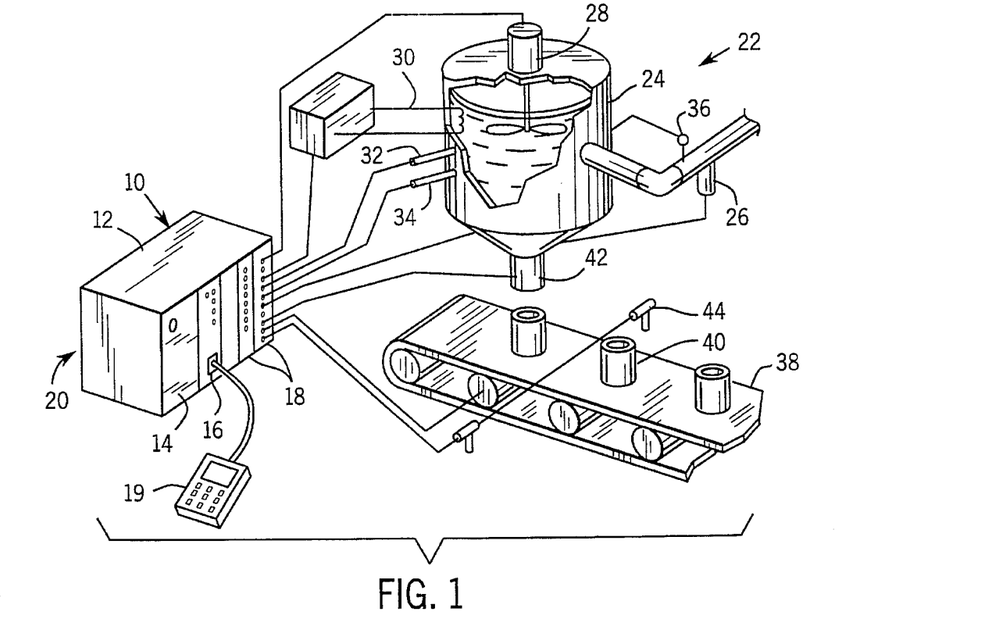
FIG. 1 is a perspective view of a simplified industrial control application including control of a conveyor line by an industrial controller employing the method of the present invention.

Referring now to FIG. 1, an industrial controller 10 for use with the present invention executes a control program expressed as a relay ladder diagram so as to control a number of elements on controlled equipment 22.

In the process example shown, I/O modules 18 are connected to sensors and actuators on a mixing tank 24 to control the flow of materials into the tank via a valve 26 and the temperature and agitation of those materials via an agitator 28 and a heater 30 under feedback control based on signals obtained from a thermal couple 32, a pressure transducer 34 and a flow sensor 36.

The industrial controller 10 also controls, in this example, a conveyor belt 38 having cans 40 to be filled from the tank 24, a spigot 42 from the tank 24, and the positioning of the conveyor belt 38. The industrial controller 10 receives signals from a limit switch 44 shown as a photoelectric beam so as to correctly position the containers under the spigot 42 for filling.

These control processes may be time sensitive and thus it is important that the industrial controller 10 execute its control program efficiently.

Attached to the industrial controller 10 is programming terminal 19 which provides a method of programming the industrial controller 10 with a relay ladder logic diagram. The relay ladder logic diagram is displayed on the terminal 19 and transmitted to the industrial controller 10 for storage in memory. It will be understood that the terminal 19 alternatively may be a desk-top unit remote from the industrial controller 10 but linked to the industrial controller for the communication of the relay ladder logic diagram.

Controller Hardware

Figure 2:
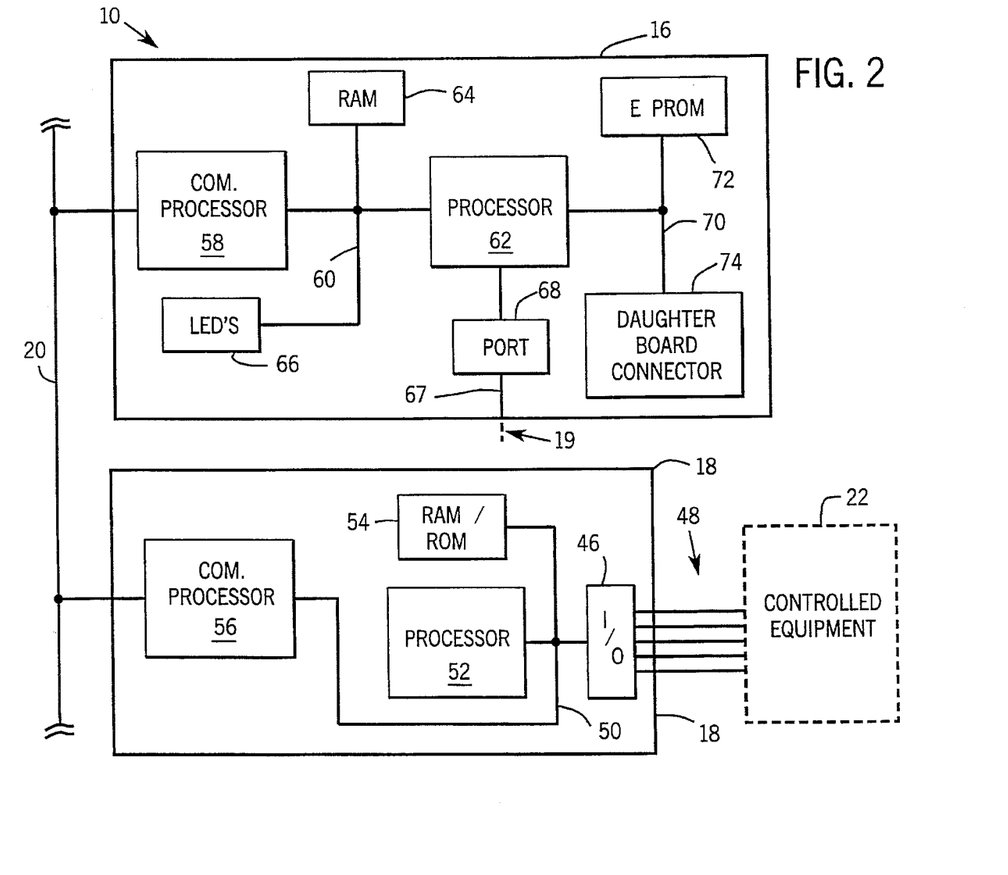
FIG. 2 is a block diagram of the controller of FIG. 1 showing the processor module, I/O module, and the latter's connection to the controlled equipment of FIG. 1.

Referring to FIGS. 1 and 2, the industrial controller 10 includes generally a rack 12 holding one or more controller modules including a power supply 14, a processor module 16 and one or more input/output, "I/O" modules 18 connected together via a backplane 20 passing the rear of the rack 12.

I/O modules such as 18 are generally known in the art and operate to receive signals and transmit them to the processor module 16 under the operation of their processor 52. The processor module 16 receives inputs from controlled equipment 22 via the I/O modules 18 and provides outputs to the controlled equipment 22 by those same I/O modules 18.

The signal lines 48 from the controlled equipment 22 are received by the I/O module 18 at interface circuitry 46. The interface circuitry 46 contains protection circuitry, such as optical isolators, and conversion circuitry, such as analog to digital or digital to analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high speed backplane 20 and relays information between that high speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally, prior to operation, the processor 62 reads program instructions from the EPROM 72 to translate the relay ladder logic diagram into a more efficient form as will be described in detail below. During operation, the processor 62 reads translated instructions of the relay ladder logic diagram from memory and transfers data to and from RAM 64, that data representing desired inputs and outputs interchanged by the communication processor 58 with the I/O module 18 and thus with the controlled equipment 22. The general architecture and operation of the industrial controller 10 thus far described will be familiar to those of ordinary skill in the art.

Translation of a Relay Ladder Diagram to an Optimized Control Program

I. Overview

Figure 3:
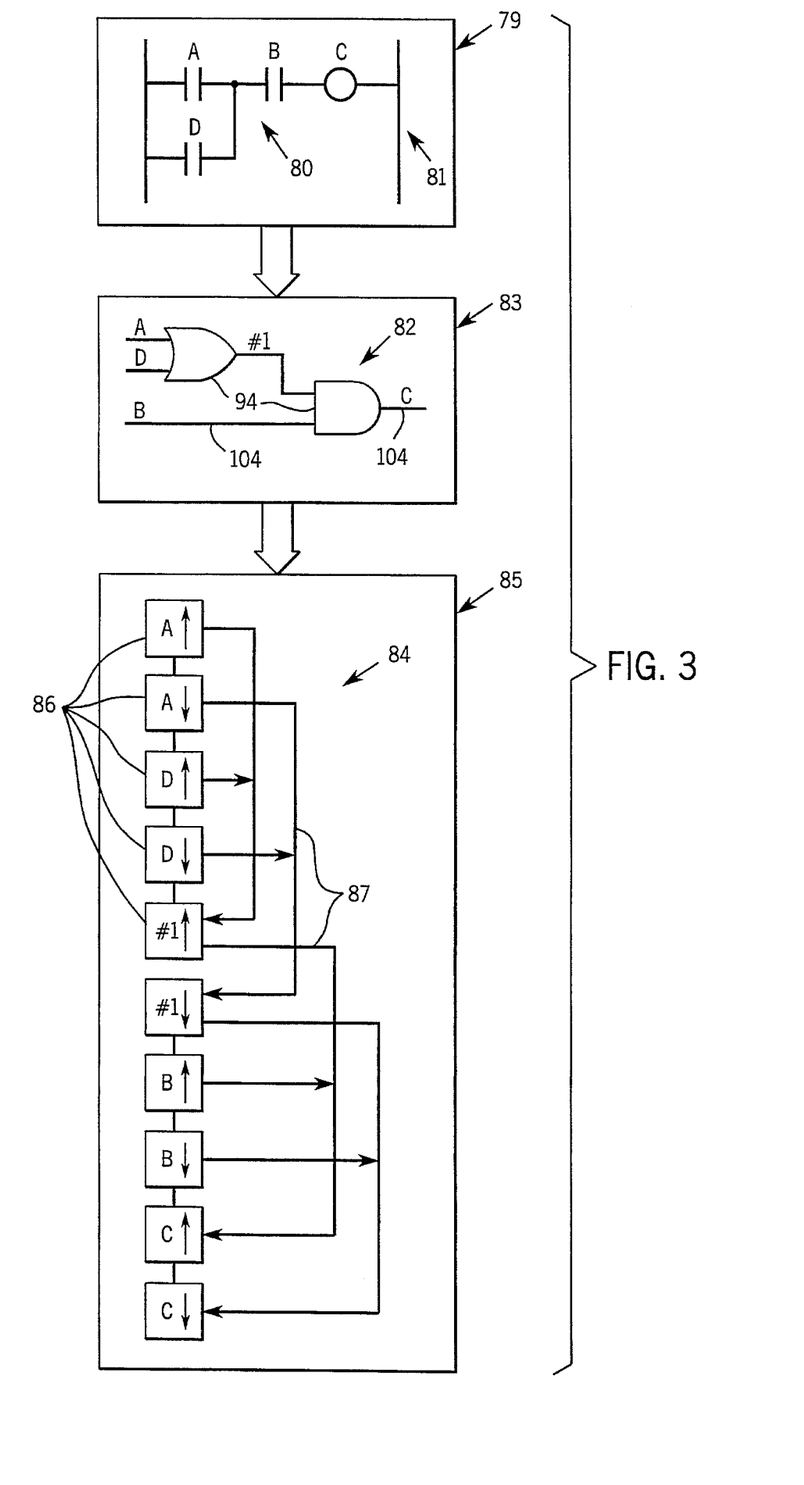
FIG. 3 is a simplified flow chart showing three steps of the present invention in which a relay ladder diagram is converted to a flow diagram and in which the flow diagram is converted to a set of linked routines.

Referring now to FIG. 3, in a first step 79, a relay ladder logic program 81 having a rung 80, is entered into the industrial controller 10 and displayed on the terminal 19.

In this example, the rung 80' includes two normally open contacts labeled A and D connected in parallel. Their parallel combination is connected in series with a normally open contact labeled B and output coil labeled C. A, B and D represent variables stored in memory and originally derived either from external signals received by the I/O module 18 of the industrial controller 10 or from the coils of other rungs. Output coil C represents a variable, also stored in memory and used either by the control process, as transmitted to the control process 22 via the I/O module 18 or by a contact of another rung.

Normally a control program will include thousands of rungs similar to 80, each of which is sequentially evaluated by the industrial controller during its operation. In the evaluation of a rung 80, the industrial controller 10 reads memory locations assigned to the particular variables A, B, and D and performs the logical evaluation determined by the topology of the rung 80, i.e., how the particular elements are arranged in parallel or in series. The result of this evaluation provides the variable C of the rung's coil which is then stored in memory.

During a second step 83, which will be described in greater detail below, the method of the present invention converts rung 80 into an equivalent "flow diagram" 82 of Boolean elements 94 interconnected by 'wires' 105 representing each variable. Here, variables A and D are represented as inputs, to a two input NOR gate, whose output, together with variable B, provide inputs to a two input AND gate. The AND-gate provides as its output, the value C. This flow diagram 82 is not necessarily displayed by the industrial controller 10 but only a representation of the restructuring of the relay ladder logic program 81 as performed by the industrial controller 10 and stored in memory. Generally, multiple rungs 80 produce a single flow diagram 82.

A fundamental distinction between the relay ladder logic program 81 and the flow diagram 82 is that in the relay ladder logic program 81, variables are represented by discrete elements (e.g., contacts and coils) and the logic of the control program is contained in the interconnection by "wires" of those elements as rungs. In contrast, the flow diagram 82 represents the logic of the control program as Boolean elements (gates) and the data values as the interconnection of those gates to one another. This distinction is important in minimizing unnecessary evaluation of portions of the logic of the control program because it permits those portions not needing evaluation to be isolated by reference to their interconnections to the portions of the logic that are being evaluated.

In a third step 85 of the present invention, the flow diagram 82 is converted to an optimized executable program 84 using standard "machine language" instructions and operating within the industrial controller 10. This optimized executable program 84 comprised of a number of separate routines 86, each routine 86 associated with one variable (wire) of the flow diagram, and further associated with whether the variable has changed from low to high or from high to low. So, for the example flow diagram 82 of FIG. 3, having 5 variables (A–C and #1) there are five up transition routines (↑) and five down transition routines (↓) each linked to the others as will be described.

Each of these transition routines 86 evaluates the logic of those Boolean elements receiving the variable (wire) of the transition routine. Each transition routine then executes calls 87 to other transition routines for the other variables (wires) attached to the outputs of the Boolean elements that it has evaluated. But these calls are only made if those output variables have changed. As will be described in greater detail below, if the output of a given Boolean element does not change, no call to the other transition routines is made thus eliminating the processing of those transition routines from the control program resulting in a considerable savings of processor time.

II. Example

Figure 4:
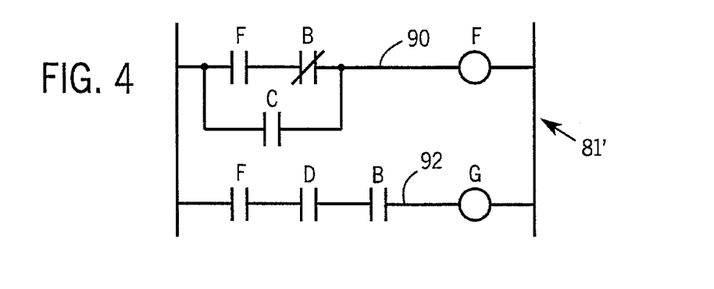
FIG. 4 is example relay ladder diagram as it is displayed on the terminal of FIG. 1 as may be executed on the controller of FIG. 1 according to the present invention.
Figure 6:
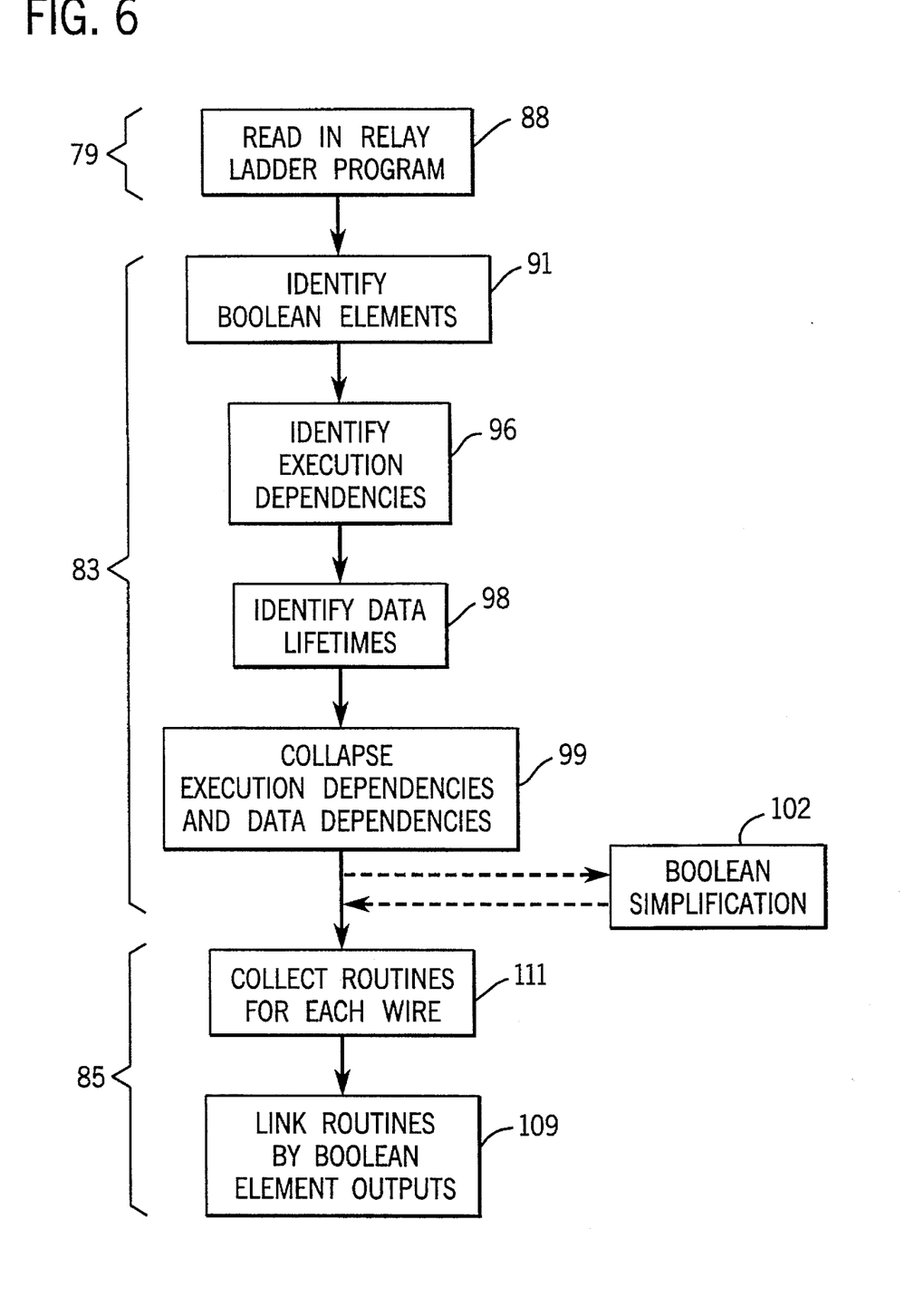
FIG. 6 is a more detailed version of the flow chart of FIG. 3.

Referring also to FIG. 6, each of the steps 79, 83, and 85 of FIG. 3 requires one or more intermediate steps in which the relay ladder rungs 80 are converted to the optimized executable program 84. The first of these steps indicated by process block 88 involves the reading in of the relay ladder logic program comprised of rungs 80 as has been generated by an operator. As mentioned, the creation of the relay ladder logic program may be done by the operator with the terminal 19 or the relay ladder logic program may be generated and edited on a remote terminal and provided to the industrial controller 10 by a modem link or the like. Rules for generating relay ladder logic programs and commercial products for writing and editing such programs are well known in the art. Referring now also to FIG. 4, a simple example of a relay ladder logic program 81' provides two rungs 90 and 92. Rung 90 has a series connected normally open contact for variable F wired in series with normally closed contact for variable B. These series contacts are shunted by parallel connected normally open contact for variable C and the combination connected in series with output coil F.

Rung 92 has normally open contacts for variables F, D and B connected in series with output coil G.

Figure 5:
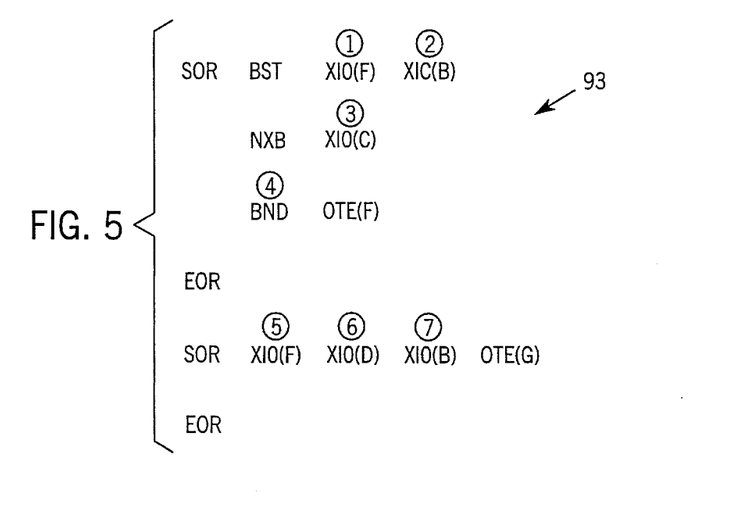
FIG. 5 is the mnemonic form of the relay ladder diagram of FIG. 4 as is stored and processed by the controller of FIG. 1.

Although the relay ladder logic program 81 is a graphical language, it is stored within the controller's memory as a set of mnemonics. FIG. 5 shows a typical mnemonic representation 93 of this relay ladder logic program 81' of FIG. 5. In this mnemonic representation, the contacts, coils and topology are represented by three letter acronyms, according to conventions well known in the art, as follows in Table I:

TABLE I

| Relay ladder Logic Mnemonic | Meaning |
|---|---|
| SOR | Start of Rung |
| BST | Branch Start |
| XIO | Normally Open Contact (examine if open) |
| XIC | Normally Closed Contact (examine if closed) |
| NXB | Next Branch |
| BND | Branch End |
| OTE | Output Coil (Output Enable) |
| EOR | End of Rung |

The mnemonics 93 provide a compact form for storing the relay ladder logic program 81 in computer memory of the industrial controller 10. The conversion between these forms may be accomplished by the terminal 19 operating according to a stored program.

Referring again to FIG. 6, the next step 91 converts the mnemonic form 93 to a flow diagram 82' per step 83 of FIG. 3. This is done by creating a set of Boolean elements 94 from which the flow diagram 82' is constructed. This identification process is straightforward and involves producing an AND element 94 for each contact of the mnemonic form 93 (XIO or XIC) and an OR element 94 for each branch end statement BND.

Figure 7:
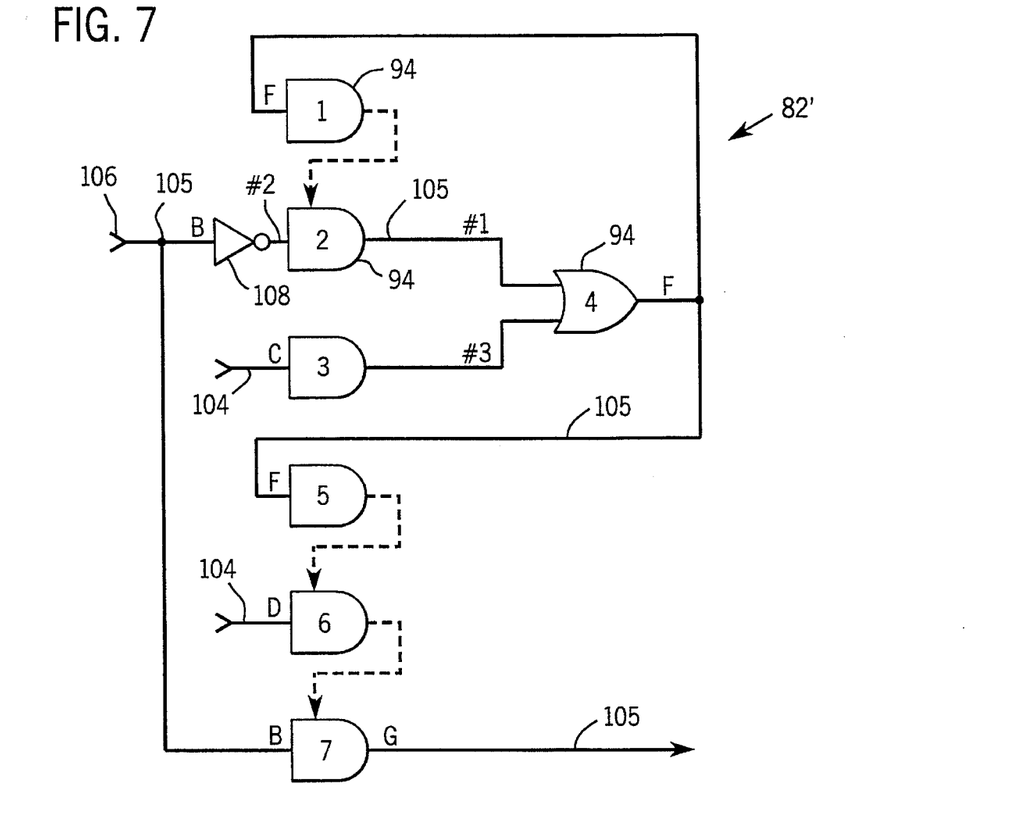
FIG. 7 is the relay ladder diagram of FIGS. 4 and 5 as converted to a flow diagram having Boolean elements, data flow paths and execution flow paths.

Referring now to FIG. 7, each of these Boolean elements 94 is numbered with a corresponding circled number found in FIG. 5 showing the correspondence between gates and contacts. This process of creating Boolean elements 94 may be done by the controller operating according to instructions in memory to scan the mnemonic form 93 of FIG. 5 and create a data structure within computer memory describing the essential characteristics of the given elements.

Referring again to FIG. 6, at process block 96, control dependencies are determined for each Boolean element 94. An control dependency describes the conditions which must exist before it becomes necessary to evaluate the state of the Boolean element 94. Thus, referring to FIG. 4, the contact labeled F in the first rung of FIG. 5 has no control dependency since it is in the first rung and connected directly to a power rail and hence its opening and closure cause immediate change in its output. In contrast, the contact labeled B in the first rung 90 has an control dependency on contact F because the state of contact B is irrelevant until contact F is closed. That is, if contact B is opened or closed, its output will still be false if F is open.

The control dependencies are shown in FIG. 7 as dashed lines between the Boolean elements 94. Referring to the relay ladder logic diagram of FIG. 4 and to FIG. 7, generally Boolean element 2 (contact B) depends in execution on Boolean element 1 (contact F) being true (closed). Boolean element 7 (also contact B) depends in execution on Boolean element 6 (contact D) being true (closed) which depends in execution on Boolean element 5 (also contact F) being true (closed).

In order to determine the control dependencies, the computer parses the mnemonic form 101 of FIG. 5 finding any contact operations (XIO, XIC) immediately upstream from the contact of the given Boolean element 94 whose control dependency is being evaluated. If a branch end (BND) is above a given Boolean element 94 then the two paths of the branch are evaluated for the immediate upstream contacts and the control dependency is a Boolean OR of multiple upstream contact operations.

Referring again to FIG. 6, next, as represented by process block 98, data lifetimes for each variable (e.g., A–F are identified. A data lifetime is created when a variable is assigned a particular value. A memory location (and hence a variable) may have many data lifetimes associated with it but only one at a time. Data lifetimes may be created by external sources, for example, variables B, C and D in the example of FIG. 4 are implicitly derived from inputs from the controlled process. Alternatively, data lifetimes may be created by outputs (coils) of the program itself, for example, variables F and G. Externally created data lifetimes are represented in FIG. 7 simply as wires 105 having arrow 106 terminators. Internally created data lifetimes are represented as wires 105 without arrows. Internally created data lifetimes include data lifetimes created by branch end instructions (BND) which create a data lifetimes for each branch.

Each wire for a data lifetime is an entry in a wire list within the computer memory and is created by a scanning of the mnemonic form of FIG. 6 for variables associated with contacts and coils and for branch end instructions.

Referring to FIG. 7, the wire 105 representing a data lifetime of a variable is connected to the input of the Boolean elements 94 associated with contact instructions (e.g., XIO, XIC) having that variable data lifetime as an operand (e.g., in the mnemonic form of FIG. 5). Thus, for example, Boolean element 2 has its input connected to wire B. In this case, where the Boolean element 2 is an examine if closed (XiC) operation, an inversion is shown by means of invertor 108 occurs prior to the variable being received by Boolean element 2. Variable B is also connected to the input of Boolean element 7. Variable wire C is connected to the input of Boolean element 3 and variable wire D is connected to the input of Boolean element 6. New data lifetimes, named #1 and #2, created by the branch end instruction are received by the input of the Boolean element 4 (an OR gate) also created by the BND instruction.

Wires for the same data lifetime of the same variable (e.g., F) are connected together and the outputs of Boolean elements (or BND instructions) immediately prior to a coil instruction (OTE) are connected to the variables for those coil instructions. Note that coil instructions do not generate a Boolean element of their own.

Although this process is shown graphically in FIG. 7, it will be understood to those of ordinary skill in the art that the connections can be represented internal to the controller 10 simply as entries within the data structures of the Boolean elements 94 in computer memory, these entries indicating a connection.

In this example of FIG. 4 there is only a single data lifetime or assignment of variables F and G. Thus the wire for F is connected to Boolean element 1 and 5 and the wire for G is connected to no other Boolean element input.

If there are multiple data lifetimes for a given variable (for example multiple coils labeled F) new variables (e.g., $F_1$ and $F_2$) are established. In the basic relay ladder logic system having only OTE coils and where jumping around rungs is not permitted, which of $F_1$ and $F_2$ is used with a gate having F as an input can be readily determined by finding the immediate proceeding OTE(F) instruction with respect to the rung of interest.

Figure 8:
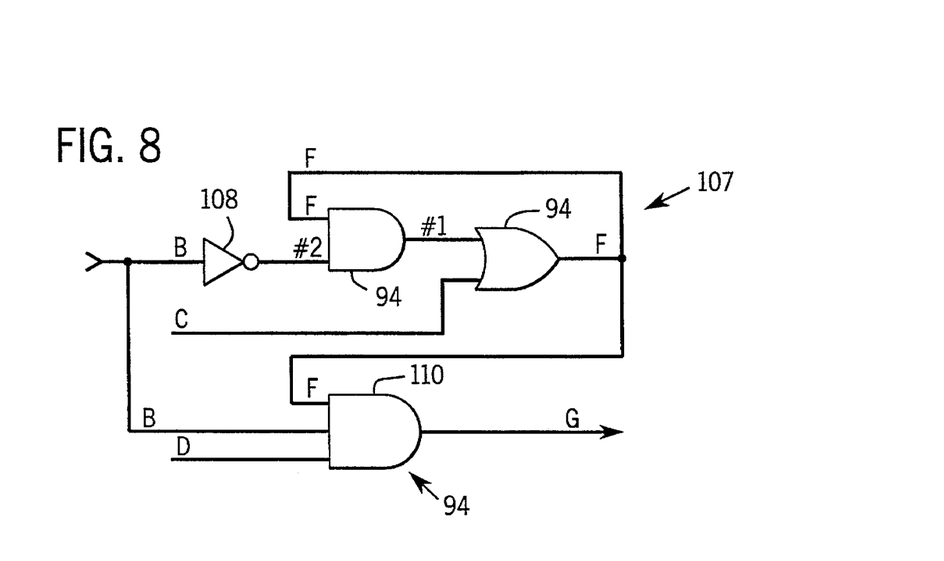
FIG. 8 is the flow diagram of FIG. 7 as simplified according to the present invention to eliminate the execution flow paths.

Referring again to FIG. 6, as represented by process block 99, the flow diagram of FIG. 7 is collapsed into a compact flow diagram 107 shown in FIG. 8 by converting Boolean elements 94 which have both execution and data dependencies into a two input AND Boolean element in which the control dependency becomes one input to the AND and the data dependency is the other input. Thus Boolean element 2 becomes a two input AND Boolean element receiving (not B) and F at its inputs. This compact flow diagram may be further simplified by well known techniques for logic minimization as shown by optional process block 102.

The collapsed version of FIG. 7 (not shown) may be simplified according to conventional logic simplification techniques to produce a simplified flow diagram that looks like a conventional logic circuit shown in FIG. 8. However, this simplification need not be done to achieve the benefits of the present invention.

Thus, a compact flow diagram 107 composed of Boolean elements and interconnections has been established with variables represented by wires and operations represented by Boolean elements. As has been said, this is in contrast to the relay ladder logic program 81' of FIG. 4, where operations are represented by the wires connecting contacts, and variables are represented by the contacts themselves.

The above process of converting the relay ladder logic program 81' into a compact flow diagram 107 provides two important changes in the control program. The first is that the flow diagram provides what is known as a "static single assignment form" in which each variable is assigned or given its value only once in the control program. This is done by dividing a variable into multiple names if it is assigned more than once. A discussion of generating static single assignment forms from a generalized computer language is described in the reference "Efficiently Computing Static Single Assignment Form And The Control Dependence Graph" by Ron Cytron et al., Transactions on Programming Languages and Systems, 13 (4), October 1991, pgs. 451–490 hereby incorporated by reference.

The second change provided by the flow diagram is that the propagation of data through the control program is made evident by the wires which connect the various Boolean elements. Thus changes in the variables and their effect on the program can be readily tracked. This permits a limited portion of the control program to be evaluated based on changes in the variables.

Referring again to FIG. 6, the next step of a compilation process, indicated by process block 111, identifies the building blocks of the control program to be ultimately executed by the industrial controller. Each building block is a routine associated with one data path or 'wire' and one type of transition of the variable of that wire. Thus, for wire B in FIG. 8, a routine will exist for an up transition of B from low to high and a second routine will exist for a down transition of B from high to low.

Figure 9:
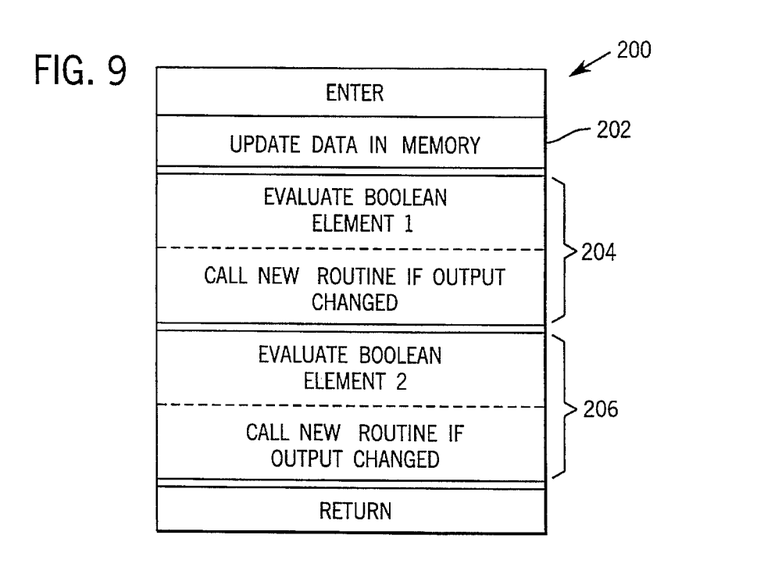
FIG. 9 is a schematic representation of a routine describing a single data flow path of the flow diagram of FIG. 8, where similar routines for all such data flow paths which are linked together in the present invention to form the control program.

Referring to FIG. 9, each routine 200 has a set of standard components. A first component 202 provides an instruction for updating the value carried by the wire in computer memory. This permits the updated wire value to be used by other routines. Thus if the routine is for an up-transition of B, the component 202 sets B to true in memory.

This component 202 is followed by one or more components 204, 206 which evaluates the outputs of each Boolean element connected to that wire. If the output has changed, the components 204 and 206 call routines associated with the wires connected to those Boolean element outputs for the type of transition occurring. For the routine associated with wire B of FIG. 8, Boolean element 108 and 110 will be evaluated and routines for wire G and #2 may be called.

The calling of one routine by the others links the routines together into the optimized executable program 84 per process block 109 of FIG. 6.

After completion of the routine 200, the routine returns to the program that called it.

These routines 200 may be generated as follows. Each wire in order is identified and a list developed of all Boolean elements to which the wire is connected as an input. Standard sets of instructions for each of those Boolean elements are then taken from a reference library and the inputs and outputs for that Boolean element referred to in the standard sets of instructions are identified to the actual wires of the Boolean elements in the circuit. Separate library elements for the Boolean elements having an up transition and a down transition for the particular input to which the wire is attached are used depending on the particular routine being developed.

The flow diagram of FIG. 8 may be converted to the optimized executable program in the following example. Because this example provides actual instructions as may be executed on an industrial controller, an idealized instruction set for an industrial controller is defined in Table II as will be generally familiar to those of ordinary skill in the art.

TABLE II

| STORE | V | store accumulator content into V |
|---|---|---|
| CLR | V | store boolean FALSE into location V |
| SET | V | store boolean TRUE into location V |
| LOAD | V | fetch variable into accumulator |
| AND | V | AND variable into accumulator |
| OR | V | OR variable into accumulator |
| CMP | V | compare variable to accumulator |
| BT | L | branch if acc.EQ.TRUE to label |
| BF | L | branch if acc.EQ.FALSE |
| SKF |  | skip next instruction if accumulator false |
| SKNE | V | skip if accumulator not equal |
| SKT |  | skip if accumulator true |
| SKF | V | skip if variable false |
| SKT | V | skip if variable true |
| CALL | S | call subroutine (pushes return onto stack) |
| CALLT | S | call subroutine if acc.EQ.TRUE |
| CALLF | S | call subroutine if acc FALSE |
| RET |  | return from subroutine (pop return from stack) |
| RETNE | V | return if acc.NE.variable |
| RETT |  | return if acc .EQ.TRUE |
| RETF |  | return if acc .EQ.FALSE |
| RETT | V | return if variable.EQ.TRUE |
| RETF | V | return if variable.EQ.FALSE |

The flow diagram of FIG. 8 is converted to the optimized executable program 84 provided in Table III composed of separate routine labels with the wire name and an up or down arrow to indicate the condition under which they are called and hence the linkage of the routines into a signal program. These routines have been optimized in some cases to eliminate the calls to other routines normally part of components 204 and 206 in cases where the target routine immediately follows the calling routine and therefore the program will properly drop through to the correct routine without a call. Such optimizations are well known to those in the computer art.

TABLE III

| ↑B: | SET | B | ;assert; B was low |
|---|---|---|---|
|  | CALL | ↓#2 | ;Note; list of contact refs . . . |
|  | LOAD | F | ; compiled in code sequence |
|  | AND | D |  |
|  | ;AND | B | ; optimized out |
|  | RETNE | G | ; optimizable to RETF |
|  | CALL | ↑G | ; G must have been low |
|  | RET |  |  |
| ↓B: | CLR | B |  |
|  | CALL | ↑#2 | ;! inline unconditional calls |

TABLE III-continued

|  |  |  |  |
|---|---|---|---|
|  | RETF | G |  |
|  | JMP | ↓G | ;CALL/RET optimized |
| ↑C: | SET | C |  |
|  | RETT | ↑F |  |
|  | JMP | F | ;CALL/RET optimized |
| ↓C: | CLR | C | ; assert; C was high |
|  | RETT | #1 |  |
|  | JMP | ↓F | ;CALL/RET optimized |
| ↑D: | SET | D |  |
|  | LOAD | F |  |
|  | AND | B |  |
|  | RETF |  |  |
|  | JMP | ↑G | ;CALL/RET optimized |
| ↓D: | CLR | D |  |
|  | RETF | G |  |
|  | JMP | ↓G |  |
| ↑#2: | SET | #2 | ;INITIALIZE by calling ↑#2 |
|  | RETF | F |  |
| ; | JMP | ↑#1 |  |
| ↑#1: | SET | #1 |  |
|  | RETT | F |  |
| ; | JMP | ↑F | ;optimized out |
| ↑F: | SET | F |  |
|  | LOAD | D |  |
|  | AND | B |  |
|  | SKNE | G |  |
|  | CALL | ↑G |  |
|  | RETF | #2 |  |
|  | JMP | ↑#1 |  |
| ↓#2: | CLR | #2 |  |
|  | RETF | #1 | ; next JMP #1 optimized out |
| ↓#1: | CLR | #1 |  |
|  | RETT | C | ; next JMP F optimized out |
| ↓F: | CLR | F |  |
|  | SKF | G |  |
|  | CALL | ↓G |  |
|  | RETF | #1 | ;SKF/RET optimized |
|  | JMP | ↓#1 |  |
| ↑G: | SET | GOUTPUT | ; signal world |
|  | RET |  |  |
| ↓G: | CLR | GOUTPUT | ; signal world |
|  | RET |  |  |

Referring to the first routine of Table III, labeled as ↑B, this routine describes the operations to be performed if there is an up transition of the B wire. As described above, the first part of the routine "sets" the B variable to update the memory of the computer. Next, the effect of the B variable on the inverter Boolean element 108 is evaluated (which requires no code) and a call is made to the down arrow transition of variable #2. This completes the evaluation of the up transition of the B variable with respect to Boolean element 108.

The effect of the up-transition of the B variable on three input AND Boolean element 110 is provided by the next sequence of instructions which loads the variable of F and ANDs it with the variable D and returns from the routine if the result is not equal to 1. Otherwise there is a call to the up transition of variable G (↑G) and the program returns.

Thus, implicit in the library of each Boolean element is the recognition that in some instances, depending on the logic of the Boolean element, no change in the output of the Boolean element 94 will occur. This lack of change in the output results in a return from the routine without calling other routines and essentially truncates the evaluation of the control program along the paths connected to that output variable.

Looking at the routine section labeled ↓B, this time the program "resets" the B variable to update the memory and calls the up transition of the #2 variable as a result of the logic of Boolean element 108 (i.e., an inverter). Here the routines may be optimized by simply evaluating whether G is already false. If it is, there is no need for further evaluation of the variables F and D and the program returns without calling another routine. On the other hand, if G were in fact high, a call is made to the ↓G. Note that this level of optimization may be implicit in the library of instructions for the particular Boolean elements or may be done after assembly of the routines.

During operation of the program formed of these routines, a "top level" routine is used to make the initial calls to the routines of Table III. This top level routine reads each external input and calls the necessary routines depending on the transition of the external inputs. Such a top level routine is shown in Table IV and generally reads each input, compares it to its last value and if there has been a change, calls the necessary routine and then repeats.

TABLE IV

Top level routine

|  |  |  |  |
|---|---|---|---|
| TOP: | READ | BINPUT | ;sample input B |
|  | CMP | B | ;compare to present state |
|  | BEQ | L1 | ;nothing changes |
|  | CALLF | ↓B | ;note transition |
|  | CALLT | ↑B | ;note transition |
| L1: | READ | CINPUT | ;sample input C |
|  | CMP | C | ;compare to present state |
|  | BEQ | L2 | ;nothing changes |
|  | CALLF | ↓C | ;note transition |
|  | CALLT | ↑C | ;note transition |
| L2: | READ | DINPUT | ;sample input D |
|  | CMP | D | ;compare to present state |
|  | BEQ | TOP | ;nothing changes |
|  | CALLF | ↓D | ;note transition |
|  | CALLT | ↑D | ; note transition |
|  | JMP | TOP | ;do forever |

It is instructive to consider the execution of this example program of Table III for the event sequence, ↑D, ↑B, ↑C, ↓C, ↓D and ↓B.

The effect of the first two of these transitions will be described. Assuming the upward transition of D occurs first, the routine so labeled in Table III is called and D is set. Referring also to FIG. 10, the values of B and F must be determined. If they are false, then the upward transition of input of D can have no effect and the routine returns. However, otherwise there is a jump to the ↑G routine which simply sets the G output and this is the completion of the programs execution for that change.

A subsequent up transition of the B variable sets B as shown in the routine in Table III and calls the ↓#2 routine. This routine clears the variable #2 and returns if the #1 variable is false. Normally there would then be a jump to the down transition of #1, however, this has been optimized out as the routine because the ↓#1 routine follows ↓#2 and the program may be allowed to drop through.

Likewise the ↓#1 routine is optimized so that if C is true and hence there will be no change in output F, the program returns but otherwise it simply drops through to the ↓F routine.

At the ↓F routine, F is cleared and if G is true, then ↓G is called otherwise if 1 is false, the program returns. Otherwise, there is a jump to the ↓#1.

It will be understood to those of ordinary skill in the art that the top level routine could be accomplished by a hardware circuit which detects changes in the external variables and makes the necessary calls by interrupt mechanisms. This would make the execution of the control program even faster.

What is important, however, is that the control program is ultimately structured so that only changes in the states of variables are transmitted and evaluated. Thus when changes in states do not result in changes in outputs, the branches of the program connected to those outputs are not evaluated, shortening the total execution time of the program, a factor that is critical for industrial real-time control.

The above description has been that of a preferred embodiment of the present invention. It will occur to those that practice the art that many modifications may be made without departing from the spirit and scope of the invention. For example, the above described process may be undertaken off-line and the industrial controller loaded with the resultant program prior to initiation of the control. In order to apprise the public of the various embodiments that may fall within the scope of the invention, the following claims are made.

I claim:

1. An industrial controller operating an industrial process according to a relay ladder language control program having a control logic, the industrial controller comprising:
   (a) input circuitry for receiving data from the industrial process;
   (b) output circuitry for providing data to the industrial process;
   (c) a programming terminal for receiving the relay ladder language control program having:
      (i) a plurality of virtual contacts and coils, the virtual contacts representing the data from the industrial process and the virtual coils representing the data to the industrial process; and
      (ii) a plurality of interconnections between contacts and coils in rungs, the interconnections representing a control logic for the industrial process;
   (d) a computer and memory receiving the relay ladder diagram from the input terminal and for providing the following means:
      (1) means for translating the relay ladder diagram into a data flow form, the data flow form providing:
         (i) a plurality of Boolean elements having inputs and outputs, the Boolean elements representing the control logic for the industrial process, and;
         (ii) a plurality of data paths between inputs and outputs of Boolean-elements; the data paths corresponding to the data to and from the industrial process;
      (2) means for associating each data path with a transition routine determining the effect of a transition in data of the given data path on the outputs of any directly connected Boolean elements having inputs connected to that data path;
      (3) means for combining the transition routines of step (2) into a control program by having each given transition routine call only transition routines associated with data paths connected to changing outputs of the given transition routine's directly connected Boolean elements; and
   (e) means connected to the input circuitry for detecting changes in data input from the industrial process to call, in an operation mode, transition routines for the data paths associated with the input data; and
   (f) means connected to the output circuitry for monitoring data paths corresponding to data to the industrial process to output that data to the industrial process.

2. The industrial controller of claim 1 wherein the computer is connected to the input circuitry and wherein the means connected to the input circuitry is provided by a program in the memory and executed by the computer.

3. The industrial controller of claim 1 wherein the means connected to the input circuitry is provided by discrete electronic circuitry separate from the computer.

4. A method of compiling relay ladder logic comprising the steps of:
   (a) receiving a relay ladder diagram providing:
      (i) a plurality of virtual contacts and coils, the virtual contacts representing data from the industrial process and the virtual coils representing data to the industrial process; and
      (ii) a plurality of interconnections between contacts and coils in rungs, the interconnections representing a control logic for the industrial process;
   (b) translating the relay ladder diagram into a data flow form, the data flow form providing:
      (i) a plurality of Boolean elements having inputs and outputs, the Boolean elements representing the control logic for the industrial process, and;
      (ii) a plurality of data paths between inputs and outputs of Boolean elements; the data paths corresponding to the data to and from the industrial process;
   (c) associating each data path with a transition routine determining the effect of a transition in data of the given data path on the outputs of any directly connected Boolean elements having inputs connected to that data path;
   (d) combining the transition routines of step (c) into a control program by having each given transition routine call transition routines associated with data paths connected to outputs of the given transition routine's directly connected Boolean elements.

5. The method of claim 4 wherein the step of associating each data path with a transition routine associates a given data path with an up-transition routine and a down-transition routine where:
   1) the up-transition routine determines the change in outputs of directly connected Boolean elements having inputs connected to the given data path when there is an up-transition in the data represented by the given data path and;
   2) the down-transition routine determines the change in outputs of the directly connected Boolean elements having inputs connected to the given data path when there is a down-transition in the data represented by the given data path;
   and wherein the step of combining, combines the transition routines of step (b) into a control program by having each given transition routine call:
      (1) up-transition routines associated with data paths connected to outputs of the directly connected Boolean elements whose inputs are connected to the data path of the given transition routine when the outputs of the directly connected Boolean elements make up-transitions;
      (2) down-transition routines associated with data paths connected to outputs of the directly connected Boolean elements whose inputs are connected to the data path of the given transition routine when the outputs of the directly connected Boolean elements make down-transitions.

6. The method of claim 4 wherein the step of translating the relay ladder diagram into a data flow form creates a Boolean element for each contact of the relay ladder diagram and interconnects the Boolean elements by data paths according to both control dependencies of each Boolean element on other Boolean elements and according to variables with common data lifetimes received by the Boolean elements.

7. The method of claim 4 wherein the relay ladder diagram includes virtual normally open contacts and virtual normally closed contacts and wherein the interconnection includes contacts arranged in parallel branches having branch ends wherein the step of translating the relay ladder diagram into a data flow form translates the normally open contacts into AND gates, the normally closed contacts into AND gates having a preceding NOT gate and the branch ends into OR gates.

8. A compiler for use with a controller controlling an industrial process and programmed with a relay ladder diagram, the relay ladder diagram providing:
- (i) a plurality of virtual contacts and coils, the virtual contacts representing data from the industrial process and the virtual coils representing data to the industrial process; and
- (ii) a plurality of interconnections between contacts and coils in rungs, the interconnections representing a control logic for the industrial process;

the compiler comprising:
instructions to an electronic digital computer to provide the following means:
- a) means for translating the relay ladder diagram into a data flow form, the data flow form providing:
  - (i) a plurality of Boolean elements having inputs and outputs, the Boolean elements representing the control logic for the industrial process, and;
  - (ii) a plurality of data paths between inputs and outputs of Boolean elements; the data paths corresponding to the data to and from the industrial process;
- b) means for associating each data path with a transition routine determining the effect of a transition in data of the given data path on the outputs of any directly connected Boolean elements having inputs connected to that data path;
- c) means for combining the transition routines of means (b) into a control program by having each given transition routine call transition routines associated with data paths connected to outputs of the given transition routine's directly connected Boolean elements.

9. The compiler of claim 8 wherein the means for associating each data path with a transition routine associates a given data path with an up-transition routine and a down-transition routine where:

1) the up-transition routine determines the change in outputs of directly connected Boolean elements having inputs connected to the given data path when there is an up-transition in the data represented by the given data path and;
2) the down-transition routine determines the change in outputs of the directly connected Boolean elements having inputs connected to the given data path when there is a down-transition in the data represented by the given data path;

and wherein the means for combining, combines the transition routines of means (b) into a control program by having each given transition routine call:

(1) up-transition routines associated with data paths connected to outputs of the directly connected Boolean elements whose inputs are connected to the data path of the given transition routine when the outputs of the directly connected Boolean elements make up-transitions;

(2) down-transition routines associated with data paths connected to outputs of the directly connected Boolean elements whose inputs are connected to the data path of the given transition routine when the outputs of the directly connected Boolean elements make down-transitions.

10. The compiler of claim 8 wherein the means for translating the relay ladder diagram into a data flow form creates a Boolean element for each contact of the relay ladder diagram and interconnects the Boolean elements by data paths according to both control dependencies of each Boolean element on other Boolean elements and according to common data represented by the contacts creating the Boolean elements.

11. The compiler of claim 8 wherein the relay ladder diagram includes virtual normally open contacts and virtual normally closed contacts and wherein the interconnection include contacts arranged in parallel branches having branch ends wherein
the means for translating the relay ladder diagram into a data flow form translates the normally open contacts into AND gates, the normally closed contacts into AND gates having a preceding NOT gate and the branch ends into OR gates.

* * * * *